Oct. 15, 1929.  J. R. THOMPSON  1,732,175
JACK
Filed Aug. 24, 1926  2 Sheets-Sheet 1

J. R. Thompson INVENTOR

Oct. 15, 1929.  J. R. THOMPSON  1,732,175
JACK
Filed Aug. 24, 1926   2 Sheets-Sheet 2
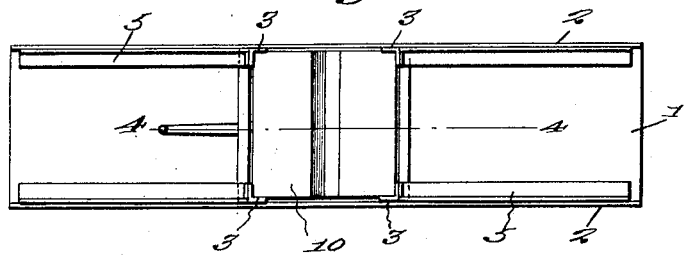
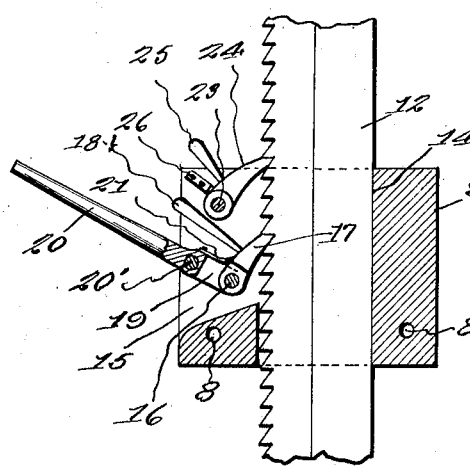
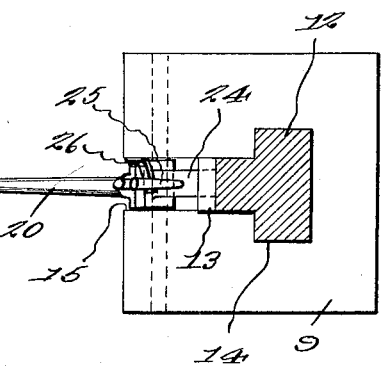
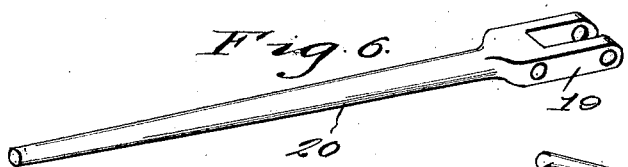
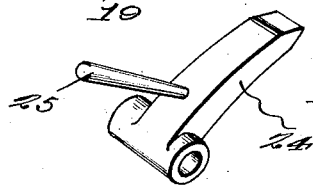
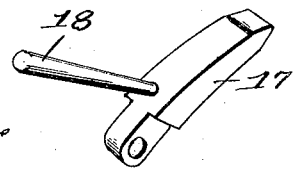
J. R. Thompson INVENTOR Patented Oct. 15, 1929

1,732,175

UNITED STATES PATENT OFFICE

JAMES ROSS THOMPSON, OF TULSA, OKLAHOMA

JACK

Application filed August 24, 1926. Serial No. 131,243.

An object of this invention is the provision of means for elevating and supporting spools around which heavy cables are wound to permit of the free turning of the spool and the unwinding of the cable therefrom.

A further object is the provision of a means for this purpose that comprises a pair of frames which are simply but strongly constructed and which have arranged therein vertically adjustable blocks that receive therethrough the shanks of jack heads, the latter being also guided in the frame, and wherein means carried by the blocks impart a vertical movement to the jacks, as well as lock the jacks on the blocks, and whereby the ends of the removable bar for the cable carrying spool are engaged by, elevated and journaled on the jack heads so that the spool may freely turn during the unwinding of the cable therefrom.

A still further object is the provision of simple, strong and effective means for elevating and supporting spools on which are wound heavy electric or other cables in a manner to permit of the free rotation of the spool during the unwinding of the cable therefrom, and likewise to permit of the lowering of the spool when all or when a sufficient quantity of cable has been removed.

A still further object is the provision of a means for this purpose characterized by simplicity in construction, ease in operation and thorough efficiency in the performance of its function.

For a more comprehensive understanding of the invention reference is to be had to the accompanying drawings which are to be read in connection with the following description:

In the drawings:—

Figure 3 is a top plan view thereof.

Figure 4 is a sectional view on the line 4—4 of Figure 3.

Figure 5 is a sectional view on the line 5—5 of Figure 2.

Figure 6 is a perspective view of the handle for the operating dog.

Figure 7 is a similar view of the operating dog.

Figure 8 is a similar view of the holding dog.

Figure 1:
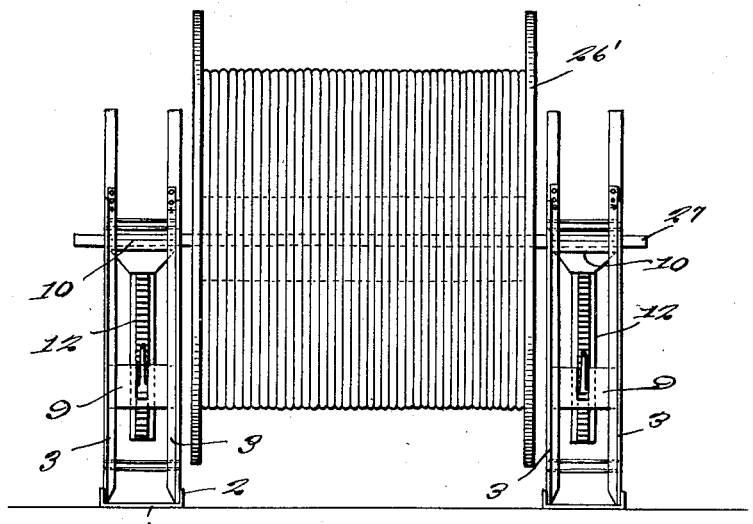
Figure 1 is a view of my improvement in operative position.

The drawings illustrate one satisfactory embodiment of my improvement, and by reference thereto it will be seen that I make use of two jacks and frames therefor, but as each is of a similar construction a detail description of one will be taken as equally applicable to the other.

Each member of the improvement comprises a frame which is wholly constructed of metal of sufficient gage and strength to accomplish my purpose. Each frame includes a flat base 1 having flanged sides 2. Thus each base is in the nature of a channel member. The base 1 is comparatively wide and riveted or otherwise fixedly secured to the flanges thereof, at points equidistant from the center of the base, there are oppositely disposed pairs of uprights 3. The uprights comprise angle members, and the opposite pairs of uprights have, at desired intervals, secured thereto channeled transverse braces 4. Between the outer sides of the uprights and the base 1 there are angle braces 5 which are also preferably in the nature of angle irons.

Figure 2:
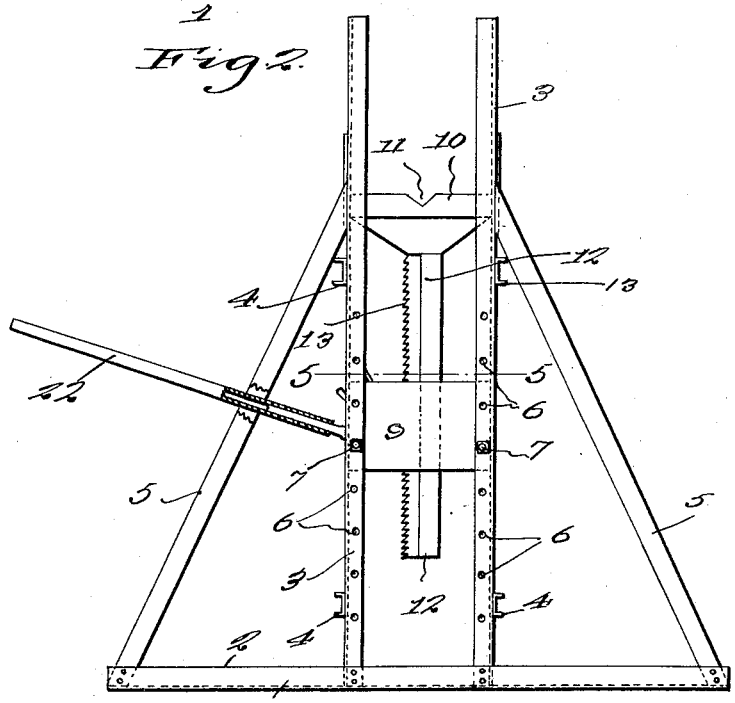
Figure 2 is a side elevation of one of the members constituting the improvement.

The outer faces or flanges of the uprights 3 are provided with apertures 6, arranged to receive therethrough removable pins 7 that also pass through openings 8 in a block member 9 that is guided between the uprights as best shown in Figure 2. By this arrangement it will be seen that the block 9 is supported for vertical adjustment on the uprights, and also it is to be noted that the corners of the block contact with the inner faces of the angle uprights.

Having its corners in slight contacting engagement with the inner faces of the guide provided by the uprights 3 there is a jack head 10. The upper face of each jack head 10 has a transverse preferably V-shaped groove 11 therethrough, and the under face of each jack head is formed with a depending stem. Each stem 12 is substantially T-shaped in cross section, and the central element thereof has its outer edge formed with saw teeth 13. The stem 12 is received through a T-shaped opening 14 in the block 9, and the said block, from its upper face, has a slot or opening 15 that communicates with the central branch of the T-shaped opening 14. Received in the opening 15 there is an operating dog 17 which engages with the teeth 13 of the stem 12. This dog is provided with an outwardly extending handle 18, and the reduced inner end of the dog is straddled by and pivoted to the bifurcated end 19 of an operating lever 20. The lever is pivoted in the opening 15, as at 20' and the said lever has fixed thereon one end of a flat spring 21 whose opposite end contacts with the dog 17 to influence the same to engage with the teeth of the rack 12. If desired, and as illustrated by Figure 2 of the drawings, the lever 20 may be provided with an extension 22.

Pivoted, as at 23, in the opening 15 of the block 9, above the pivot 16, there is a holding dog 24. This dog is also provided with an outstanding handle 25, and spring means 26 influence the dog to engage with the teeth 13 of the stem 12.

The spool on which the heavy cable is wound is indicated by the numeral 26' and is shown in Figure 1 of the drawings. This spool has passed through the central opening thereof a bar 27. In the application of my improvement I arrange the frames at the sides of the spool, and thereafter raise the blocks and jack heads so that the ends of the rod 27 will rest in the grooves 11. I then insert through the aligning openings in the uprights that provide the guide for the block and jack head the strong pins 7, which, of course also pass through the openings 8 in the blocks. The operating lever 20 is then swung downwardly so that the jack heads are raised the distance between two of the teeth 13, the holding dog preventing the downward movement of the jack heads. It is only necessary to raise the spool a slight distance above the ground surface, so that only a couple of downward movements of the operating levers are required. The levers 20 are comparatively long, but when the extensions 22 are arranged thereon a powerful leverage is obtained. When the spool is elevated the cable can be readily and easily unwound therefrom, the rod may serve as a shaft for the spool to revolve therewith or to permit of the spool being revolved therearound. However, the V-shaped notches in the heads 10 may hold the rods from free turning, so usually the spools turn on the rod.

After all or a sufficient length of cable has been unwound or removed from the spool the spool may be lowered by alternately swinging the operating and holding dogs into and out of engagement with the teeth 13 of the stems 12, so that a weighted spool may be thus as readily lowered as elevated.

The simplicity of my construction and the time and labor saving qualities thereof will be fully understood and appreciated by those skilled in the art to which the invention relates. My improvement obviates the manual handling and the great amount of physical strain required in the raising of cable carrying spools and the arrangement of the ends of the bar 27 on suitable supports, obviates all danger to life and limb incident to such handling of the spools.

While I have herein set forth a satisfactory embodiment of the improvement as it now appears to me, it is of course, to be understood that I do not wish to be restricted to the precise details of construction herein set forth, and therefore hold myself entitled to make all such changes therefrom as fairly fall within the scope of my invention without departing from the spirit thereof or exceeding the scope of the appended claim.

Having described the invention, I claim:—

A jack including four angle uprights arranged in rectangular formation in plan, a block positioned between the uprights and adjustably supported thereon, said block having a central T-shaped vertical opening, a jack head rectangular in plan and positioned between the uprights, with each corner of said head received by one of said uprights, said head having a depression formed in the upper surface thereof, a stem depending from the jack head and being T-shaped in cross section to be received by the slot in said block, teeth along one edge of the stem, said block having an opening at one side between two of said uprights, and a lever operated pawl pivoted in said opening and cooperating with said teeth to elevate the jack.

In testimony whereof I affix my signature.

JAMES ROSS THOMPSON.